United States Patent
Hanebuth et al.

(10) Patent No.: US 6,691,753 B2
(45) Date of Patent: Feb. 17, 2004

(54) PNEUMATIC TIRE INCLUDING CIRCUMFERENTIAL GROOVES AND SLANTING GROOVES

(75) Inventors: Katja Hanebuth, Hannover (DE); Markus Metz, Hannover (DE); Frank Jenne, Ingolstadt (DE); Tanja Wackerhage, Peine (DE); Thomas Sych, Wedemark (DE)

(73) Assignee: Continental AG, Hannover (DE)

( * ) Notice: Subject to any disclaimer, the term of this patent is extended or adjusted under 35 U.S.C. 154(b) by 0 days.

(21) Appl. No.: 10/090,003

(22) Filed: Mar. 5, 2002

(65) Prior Publication Data

US 2002/0139462 A1 Oct. 3, 2002

(30) Foreign Application Priority Data

Mar. 6, 2001 (EP) .............................. 01105561

(51) Int. Cl.$^7$ .......................... B60C 11/03; B60C 11/13; B60C 115/00
(52) U.S. Cl. ............................ 152/209.22; 152/209.28; 152/DIG. 3
(58) Field of Search ................... 152/209.18, 209.21, 152/209.22, 209.28, DIG. 3; D12/559–562, 564–567

(56) References Cited

U.S. PATENT DOCUMENTS

| | | | |
|---|---|---|---|
| 5,105,864 A | | 4/1992 | Watanabe et al. |
| 5,370,168 A | * | 12/1994 | Boiocchi et al. |
| 5,435,366 A | * | 7/1995 | Voigt et al. |

(List continued on next page.)

FOREIGN PATENT DOCUMENTS

| | | |
|---|---|---|
| DE | 38 34 383 | 4/1990 |
| DE | 39 42 043 | 6/1991 |
| EP | 0 722 851 | 7/1996 |
| EP | 0 788 898 | 2/1997 |

(List continued on next page.)

OTHER PUBLICATIONS

English translation of Japan 4–193608.*
Patent Abstracts of Japan, vol. 1998, No. 3, Feb. 27, 1998 & JP 09 300917, Nov. 25, 1997.
Patent Abstracts of Japan, vol. 1998, No. 1, Jan. 30, 1998 & JP 09 226322 Sep. 2, 1997.

*Primary Examiner*—Steven D. Maki
(74) *Attorney, Agent, or Firm*—Smith, Gambrell & Russell, LLP

(57) ABSTRACT

A pneumatic tire for motor vehicles has a running surface profile designed in the direction of rotation, with two shoulder regions ($S_1$, $S_2$) each being a constituent of a row of shoulder blocks, and with a middle region (C) separated from them by circumferential grooves (2) running in the circumferential direction; this middle region encompasses the width of the circumferential grooves (2) and covers a minimum width of 60% of the width of the running surface (B), is free from circumferential grooves running in the circumferential direction and is equipped with a number of V-shaped running rills (1), which open into the circumferential grooves (2) and whose V-peaks rest at least essentially on the equator line (M—M). In the two partial regions of the middle region (C) running to the side of the equator line (M—M) there are a number of slanting grooves (4) which are oriented in the same direction to the course of the V-shaped rills (1), crossing at least three V-shaped rills (1) following each other in the circumferential direction and being at least essentially of a straight design, wherein these slanting grooves (4) run at an incline at a much smaller angle ($\beta$, $\beta'$) to the equator line (M—M) than the V-shaped rills (1) and which are the widest of all grooves or rills of the profile, wherein the slanting grooves (4) of the one partial region of the middle region (C) are offset in the circumferential direction with respect to those of the other partial region.

3 Claims, 1 Drawing Sheet

U.S. PATENT DOCUMENTS 5,725,700 A * 3/1998 Ichiki
6,109,317 A * 8/2000 Iwamura et al.
6,415,834 B1 * 7/2002 Carra et al.
6,481,480 B1 * 11/2002 Schuster et al.

FOREIGN PATENT DOCUMENTS

| JP | 4-193608 | * 7/1992 |
| JP | 7-132710 | * 5/1995 |
| JP | 2000-272308 | * 10/2000 |

* cited by examiner

PNEUMATIC TIRE INCLUDING CIRCUMFERENTIAL GROOVES AND SLANTING GROOVES

INTRODUCTION AND BACKGROUND

The present invention pertains to a pneumatic tire for motor vehicles with running surface profile designed in the direction of rotation, with two shoulder regions each being a constituent of a row of shoulder blocks, and with a middle region separated from them by circumferential grooves running in the circumferential direction; this middle region encompasses the width of the circumferential grooves and covers a minimum width of 65% of the width of the running surface, is free from circumferential grooves running in the circumferential direction and is equipped with a number of V-shaped running grooves, which open into the circumferential grooves and whose V-peaks rest at least essentially on the equator line.

A pneumatic tire for motor vehicles with a running surface designed in this manner is known, for example, from EP-A1-0 788 898. In the middle region of the running surface the rills running at a V-shape in a sequence in the circumferential direction are alternately joined left and right of the equator line by grooves aligned opposite to their profile. Together with additional, comparatively narrow grooves which each are located halfway between the V-peaks of the rills and the outer, circumferential grooves, there is an arrangement of the middle region into profiled positives.

A running surface profile which has no circumferential grooves going all the way around in the circumferential direction, is known from DE-A1-38 34 383. The profile rills are arranged so that a rotation-based running surface is produced which consists of a number of slant-oriented profile positives running at an acute angle to the equator line. The profile positives and the rills in one half of the running surface are directed opposite to those in the other half of the running surface. A particularly good drainage capability is to be achieved by this configuration.

The running surface profile known from DE-A1-39 42 043 has a similar configuration. Transverse cuts of small width are provided parallel to the profile positives and profile rills, emanating from the shoulder regions. These cuts are intended to improve the wet slip resistance and the noise level of the running surface profile.

In these variants of rotation-based running surface profiles known from the state of the art, the primary objective is to achieve a good drainage capacity in order to prevent the occurrence of aqua-planing. The proposed measures do indeed provide a certain contribution toward this end, however, they cannot satisfy the ever-increasing requirements.

Accordingly, it is an object of the present invention to improve the water-diverting properties of a pneumatic tire for motor vehicles of the kind described above, so that even under unfavorable conditions and at the fastest possible driving speed, the occurrence of aqua-planing will be prevented. In this regard, the additional tire or profile properties, whether it be the generation of noise, the wear on the running surface, handling and comfort, can be kept to a high level.

SUMMARY OF THE INVENTION

The above and other objects of the present invention can be achieved in a tire that has in the two partial regions of the middle region running to the side of the equator line of the tire a number of slanting grooves which are oriented in the same direction to the profile of the V-shaped grooves, crossing at least three V-shaped grooves following each other in the circumferential direction and being at least essentially of a straight design. In the tire of this invention, these slanting grooves run at an incline to the equator line of the tire with a much smaller angle than the V-shaped grooves and which are the widest of all grooves or rills of the profile. As a result the slanting grooves of the one partial region of the middle region are offset in the circumferential direction with respect to those of the other partial region.

The combination of rills running in a V-shape with wide slanting grooves running in the same direction as the V-shaped rills but much steeper to the circumferential direction, has proven to be particularly advantageous for a definitive improvement in the water shunting capacity. The slanting grooves jointly with the rills running in a V-shape, form a number of channels which force the water to the side. Thus, the collection of water in front of the tire often observed for the circumferential grooves and which causes the aqua-planing is prevented.

BRIEF DESCRIPTION OF DRAWINGS

The present invention will be further understood with reference to the drawing which shows a top view of a tire tread profile according to the invention.

DETAILED DESCRIPTION OF INVENTION

Figure 1:
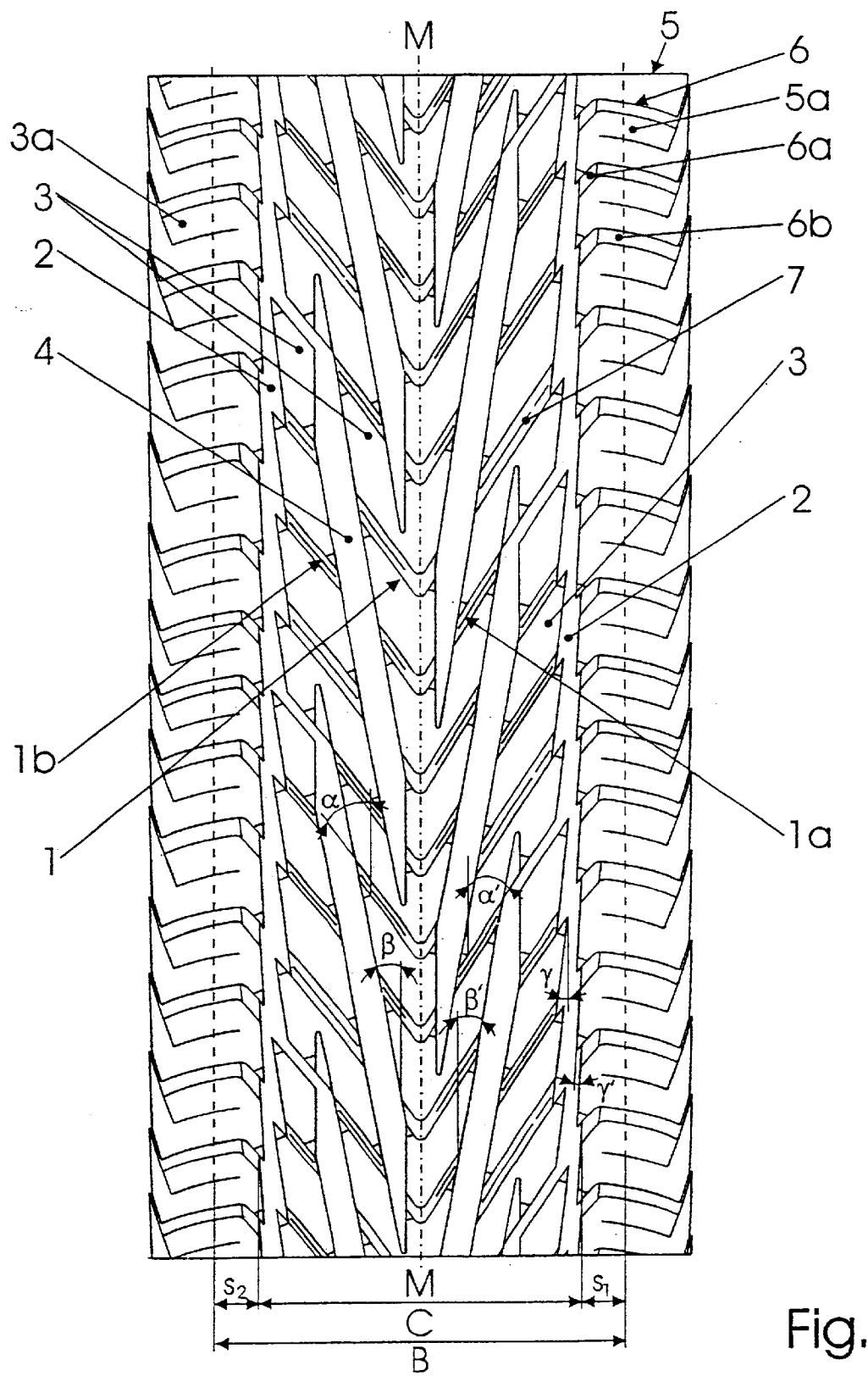

In one preferred design embodiment of the invention, all grooves and rills belonging to the middle region of the running surface are designed taking into consideration the direction of rotation, at least in sections. This factor contributes to further improvement in the water-shunting property of the tire tread profile. In this regard it is favorable when the transverse grooves running in the shoulder regions are designed in the direction of rotation, at least in sections.

In order to optimize the lateral shunting of water, it is additionally an advantage when the grooves running in a V-shape are composed at least essentially of straight running groove sections which enclose an angle of 30° to 55° with the equator line of the tire. The term equator line as used herein means the imaginary line that bisects the tire around the circumference into two equal sized portions.

It has proven to be particularly advantageous when the slanting grooves on the tire tread enclose an angle of 5° to 15° with the equator line. Even this kind of slope of the slanting grooves can effectively prevent the above mentioned collection of water in front of the tire.

The water flowing in the slanting grooves can be deflected very effectively to the side of the tire when the slanting grooves cross four sequential, V-shaped rills running in the circumferential direction.

The slanting grooves are provided, in particular, with end sections running together at an acute angle and which end within the profile positives; i.e. the positive areas of the tread. This feature is an advantage for the rigidity of the particular profile positive.

An additional measure that promotes the drainage capacity of the running surface is the fact that the slanting grooves running in one of the partial regions of the middle region, follow each other sequentially in the circumferential direction, in such a manner that they each run at a lateral overlap over a portion of their length, in particular over at least one-third of their length, with respect to an adjacent slating groove.

One method which in particular has a favorable effect on reducing the rolling noise, is to arrange the slanting grooves running in a portion of the middle region of the tire tread to be offset in the circumferential direction with respect to the slanting grooves running in the opposite half of the tire tread.

In order to provide the middle region with stability to promote uniform tire tread wear and good driving properties, it is an advantage that the grooves running in the V-shape have a smaller depth at least for the predominant part of their length, in comparison to the full depth of the profile.

In one preferred design embodiment of the invention, the sections of the rills running at a V-shape and having the lesser depth are provided centrally and along their length with a slot of lesser width.

One feature, which is favorable for uniform stability of the middle region, is that each section of the V-shaped running grooves running to the circumferential grooves which is intersected by an end section of a slanting groove located toward the edge of the tire tread, is designed at the full profiled depth.

In this regard it is also an advantage when the sections of the slanting grooves ending in the profiled positive areas and located towards the edge of the tire tread are designed with a lesser depth in comparison to the full depth of profile.

Finally, for good wet running conditions; i.e. wet-gripping of the tire tread profile, it is an advantage that the edges of the profiled positive area bounding the circumferential grooves and the shoulder blocks are inclined with respect to the equator line by an angle of at most 5° and are inclined in the same direction to the V-shaped running grooves.

Additional properties, advantages and details of the invention will now be explained in greater detail, based on the drawings which illustrates one design embodiment.

The tire tread profile illustrated in FIG. 1, is a profile suitable in particular for summer driving on passenger vehicles, especially for tires intended for higher speeds. In the following description the configuration of the profile within the width B, which amounts to at least essentially the width of the tire tread in the road contact surface (according to E.T.R.T.O. Standards Manual), is described, that is, the road contact width.

The tire tread profile consists of three regions extending in the circumferential direction: one middle region C primarily defining the profile, and two equally wide shoulder regions $S_1$, $S_2$. The middle region C takes up between 60 and 80%, in particular at least 65%, of the width of the tire tread B and is bounded by two shoulder regions $S_1$, $S_2$ and includes circumferential grooves 2 running in the circumferential direction at the profile depth, for example, 8 mm. These circumferential grooves are considered to be part of the middle region C. The tire tread profile as shown is designed to operate in the sense of tire rotation, and in the illustrated embodiment all slanting grooves and V-shaped rills together determine the sense of rotation; i.e. they point in the direction of tire travel, since they themselves are designed to operate in the sense of rotation, at least in sections.

Each shoulder region $S_1$, $S_2$ is a constituent of a block row 5, whose blocks 5a are separated in the circumferential direction by a plurality of transverse grooves 6.

The middle region C of the tire tread is organized by a number of rills 1 running in a V-shape and a number of slanting grooves 4 in the profile positive area 3, also called profile blocks here. The profile positives are also known as tread blocks as they are the portions of the tread on contact with the road. The rounded peaks of the V-shaped rills 1 are located on the equator line M—M of the tire tread which is the imaginary line dividing the tire tread in half. And in each half of the tire tread the rills consist of a straight rill portion 1a, 1b opening in the particular circumferential groove 2. The rill parts 1a running in the one half of the tire tread (the left half in FIG. 1) enclose an acute angle α with the circumferential direction of the tire (equator line M—M); said angle is the same size for all rills 1 and amounts to between 30° to 50°, in particular about 40°. The rill parts 1b running opposite to these rill parts 1a in the second half of the tire tread enclose an acute angle α' with the circumferential direction (equator line M—M) which is slightly greater, in particular 2° to 7° greater than the angle α of the associated rill part 1a in the other half of the tire tread. A tire with a road surface tread designed in this manner is to be mounted to the motor vehicle so that the V-peaks of the rills 1 during rolling of the tire are the first to make contact with the roadway when the tire is rolling. The difference between the angles α and α' has the result that the profile positive 3 in the two halves of the tire tread are not designed to be exactly symmetrical to the equator line M—M, so that an asymmetry in the design of the tire tread is attained which is favorable for reducing the rolling tire noise.

The width of the V-shaped rills 1 designed to have a constant width across their profile ranges from 2 to 4 mm. However, the width of the rills 1 can be varied from rill to rill. In the illustrated embodiment, the rills 1 are in any case designed as more narrow than the circumferential grooves 2 and the slanting grooves 4.

In each half tread section of the middle region C running to either side of the equator line M—M there are a plurality of slanting grooves 4 which are straight running grooves which run nearly in the circumferential direction, but each for only a certain distance and do not open out into the circumferential grooves 2. The slanting grooves 4 located in each half tread region of the middle region C run at least essentially parallel to each other and are inclined with respect to the circumferential direction (equator line M—M) at a comparatively small, acute angle β or β' of 5° to 15°, in particular around 10°, and each is inclined equally to the slope of the rill parts 1a, 1b, so the angle β' is slightly larger than the angle β. In the illustrated design embodiment each slanting groove 4 intersects five sequential rills 1 in the circumferential direction, so that each slanting groove 4 extends across four whole equivalent profile sections 3 (pitches) repeated over the circumference and each slanting groove 4 ends within the adjoining profile section 3 in the circumferential direction. Over the majority of its length, roughly over about three profile sections, the slanting groove 4 are of constant width, in particular at a width of 7 to 8 mm, and are in any case the widest grooves of the tire tread profile. The ends of each slanting groove are designed to run or converge together at a point, since the groove edges running nearest the center of the tire tread are oriented at least essentially in the circumferential direction at their ends located near the center of the tire tread, and at their other ends, the groove edges running in the tire tread nearest the outside edge of the tire are oriented at least essentially in the circumferential direction over a certain length, for example, over about 1.5 profile sections.

The ends of the slanting grooves 4 located nearest the center of the tire tread extend closely to the equator line M—M. For stability reasons, the ends located nearest the outside edge of the tire tread end at a certain distance from the two circumferential grooves 2. The positioning of these ends, in this regard, is left to the desire of the person skilled in the art.

In each partial region or half section of the middle region C the slanting grooves 4 which are sequential in the circumferential direction overlap in the transverse direction, and specifically over at least one-third of their length. The slanting grooves 4 running in the one partial region of the middle region C are offset in the circumferential direction with respect to the slanting grooves 4 running in the other half section or partial region of the tire tread, and specifically in such a manner that the ends located nearest the center of the tire tread of the slanting grooves 4 running in the one partial region each end roughly in the middle between two ends (neighboring in the circumferential direction) of the slanting grooves 4 running in the other partial region. In addition, the slanting grooves 4 running in the left partial region are designed as slightly longer than in the other half of the tire tread. This is a feature to adapt the stretching of the slanting grooves 4 to the different profile of the rill parts 1a, 1b.

The edges of the profile positive area 3 of the middle region C bordering the circumferential grooves 2 toward the center of the tire tread are inclined with respect to the equator line M—M in correspondence with the slope of the neighboring slanting grooves 4. The angle of the slope γ in this regard, is a very small acute angle on the order of 2° to 5°. On the edge of the tire tread, the circumferential grooves 2 are bounded by the relevant edges of the blocks 5a, which run at an incline to the equator line M—M at an angle γ', and the slope is in the same direction as the slope of the edges of the profile positive 3. The angle γ' is somewhat smaller than the angle γ and in particular is as much as 3°. Thus, in the illustrated design embodiment, all grooves 2, 4 running in the middle region C of the tire tread and grooves 1 are oriented to correspond to the sense of rotation of the profile.

The transverse grooves 6 running in the shoulder regions S1, S2 are composed of two transverse groove sections 6a, 6b, and the transverse groove sections 6a open into the circumferential grooves 2 and with respect to the equator line M—M they run at least essentially in consonance with the orientation or the slope of the rill portions 1a, 1b. Thus, the transverse grooves 6 also determine the sense of rotation of the tire tread. The second transverse groove sections 6b run essentially in a transverse direction. In the illustrated design embodiment they are oriented with respect to the transverse direction of the tire tread at a small, acute angle on the order of 2° to 10°, and opposite the slope of the rills 1 of the profile. Thus, the stability of the tire tread profile when traveling on a curve will be affected favorably. The transverse groove sections 6b can also run in consonance with the orientation of the other grooves and rills in the tire tread profile.

Both in the middle region C and also in the shoulder regions $S_1$, $S_2$, the profile is organized into equivalent profile sections (pitches) located in the circumferential direction, but with different circumferential lengths, in order to reduce the rolling noise. In the middle region C the profile sections each comprise the profile positive 3 running between two neighboring rills 1 and one of these rills 1 are provided in three different circumferential lengths whose sequence (pitch sequence) is determined by calculation. Also, the two rows of shoulder blocks 5 are composed of equivalent profile sections, and each profile section consists of one block 5a and one of the adjoining transverse grooves 6. In the illustrated embodiment, three different circumferential lengths (not denoted by reference number) are provided for these profile sections. The sequence of the individual profile sections of the shoulder regions $S_1$, $S_2$ over the circumferential of the tire tread is likewise determined by computation. The two shoulder regions $S_1$, $S_2$ coincide with regard to pitch sequence and also in total number of pitches, however, they are offset to each other in the circumferential direction and have a total number of pitches which is greater than the total number of pitches or profile sections in the middle region C. The offset is one means for promoting a nonuniformity which is favorable with respect to the rolling noise. The smaller total number of pitches in the middle region C promotes the stability of the profile positive 3 and thus counteracts a nonuniform wear of the tire tread. Due to the relatively large slope of the rills 1 and of the slanting grooves 4 in the middle region C, the circumferential length of the profile positive 3 might become too small with a larger total number of pitches.

The V-shaped running rills 1 are mostly not cut to the standard profile depth, but rather have a depth which amounts to 40 to 70%, in particular around 50% of the profile depth. Rills 1 running in a V-shape which are intersected by one end of a slanting groove 4 on the outside edge of the tire tread, have rill sections leading to the circumferential groove 2 and these rill sections are cut to the full depth of the profile. All other rills 1 or all other sections of the rills 1 are provided with smaller depth. Rills 1 or sections of rills 1 which are designed at lesser depth are provided centrally, at least over a portion of their length, with a narrow slot 7. The width of the slot 7 amounts to about 0.5 to 0.6 mm. The slots 7 extend preferably out to a depth which corresponds to at least the legal minimum profile depth.

The end sections of the slanting grooves 4 ending within a profile positive 3 and running together at a peak are likewise not cut to the full profile depth, but rather to about 40 to 70%, in particular about 50% of that value. This also a feature that stabilizes the relevant profile positive 3.

As is further illustrated in particular in FIG. 1, all comers of the profile positive 3 or of the shoulder blocks 5 forming an acute angle in the known manner, are beveled in order to counteract any irregular tire tread wear.

The invention is not restricted to the illustrated design embodiment, for example, the dimensional data presented in the description for the widths of grooves and rills or angles are merely preferred values which can be varied. The slanting grooves and/or the V-shaped rills can also have a slightly curved profile. The circumferential grooves located on the shoulder can be differently designed, in particular, they can have a straight profile. The slanting grooves can also be designed to be shorter, but should intersect at least three V-shaped running rills.

Further variations and modifications of the foregoing will be apparent to those skilled in the art and are intended to be encompassed by the claims appended hereto.

European priority application 01105561.3 is relied on and incorporated herein by reference.

We claim:

1. A pneumatic tire for a motor vehicle comprising a running surface profile designed in the direction of rotation, and having an equator line, with two shoulder regions each being a constituent of a row of shoulder blocks, and with a middle region separated from said two shoulder regions by a circumferential grooves running in the circumferential direction on each side of the middle region; said middle region encompassing the circumferential grooves and covering a minimum width of 60% of the running surface width, being free from circumferential grooves running in the circumferential direction and having a plurality of V-shaped rills which open into the circumferential grooves and have V-peaks located essentially on the equator line, said middle region having a partial region on each side of the equator line forming a right half and a left half of the middle region, in each of the partial regions of the middle region running to a side of the equator line there are a plurality of slanting grooves which are oriented in the same direction to the course of V-shaped rills, crossing at least three V-shaped rills following each other in the circumferential direction and being at least essentially of a straight design, wherein these slanting grooves run at an incline at a smaller angle to the equator line than the V-shaped rills and which slanting grooves are the widest of all grooves or rills of the profile, wherein the slanting grooves of one partial region of the middle region are offset in the circumferential direction with respect to the slanting grooves of the other partial region and wherein each of the slanting grooves have end sections meeting in a point and end within a profile positive.

2. A pneumatic tire for a motor vehicle comprising a running surface profile designed in the direction of rotation, and having an equator line, with two shoulder regions each being a constituent of a row of shoulder blocks, and with a middle region separated from said two shoulder regions by circumferential grooves running in the circumferential direction on each side of the middle region; said middle region encompassing the circumferential grooves and covering a minimum width of 60% of the running surface width, being free from circumferential grooves running in the circumferential direction and having a plurality of V-shaped rills which open into the circumferential grooves and have V-peaks located essentially on the equator line, said middle region having a partial region on each side of the equator line forming a right half and a left half of the middle region, wherein each V-shaped rill has a smaller depth at least for the predominant part, in comparison to the full depth of the profile, and wherein sections of the V-shaped rills provided with the smaller depth are provided centrally and along their length with a slot of lesser width, in each of the partial regions of the middle region running to a side of the equator line there are a plurality of slanting grooves which are oriented in the same direction to the course of V-shaped rills, crossing at least three V-shaped rills following each other in the circumferential direction and being at least essentially of a straight design, wherein these slanting grooves run at an incline at a smaller angle to the equator line than the V-shaped rills and which slanting grooves are the widest of all grooves or rills of the profile, wherein the slanting grooves of one partial region of the middle region are offset in the circumferential direction with respect to the slanting grooves of the other partial region.

3. A pneumatic tire for a motor vehicle comprising a running surface profile designed in the direction of rotation, and having an equator line, with two shoulder regions each being a constituent of a row of shoulder blocks, and with a middle region separated from said two shoulder regions by a circumferential grooves running in the circumferential direction on each side of the middle region; said middle region encompassing the circumferential grooves and covering a minimum width of 60% of the running surface width, being free from circumferential grooves running in the circumferential direction and having a plurality of V-shaped rills which open into the circumferential grooves and have V-peaks located essentially on the equator line, said middle region having a partial region on each side of the equator line forming a right half and a left half of the middle region, in each of the partial regions of the middle region running to a side of the equator line there are a plurality of slanting grooves which are oriented in the same direction to the course of V-shaped rills, crossing at least three V-shaped rills following each other in the circumferential direction and being at least essentially of a straight design, wherein these slanting grooves run at an incline at a smaller angle to the equator line than the V-shaped rills and which slanting grooves are the widest of all grooves or rills of the profile, wherein the slanting grooves of one partial region of the middle region are offset in the circumferential direction with respect to the slanting grooves of the other partial region wherein axially outer sections of the slanting grooves ending in a profiled positive are designed with a lesser depth in comparison to the full depth of profile.

* * * * *